(12) United States Patent
O'Reilly (10) Patent No.: US 10,406,898 B2
(45) Date of Patent: Sep. 10, 2019

(54) TRUCK BED COVER AND METHOD THEREOF

(71) Applicant: Thomas E. O'Reilly, Pottsville, PA (US)

(72) Inventor: Thomas E. O'Reilly, Pottsville, PA (US)

( * ) Notice: Subject to any disclaimer, the term of this patent is extended or adjusted under 35 U.S.C. 154(b) by 0 days.

(21) Appl. No.: 15/976,293

(22) Filed: May 10, 2018

(65) Prior Publication Data

US 2019/0168590 A1    Jun. 6, 2019

Related U.S. Application Data

(60) Provisional application No. 62/594,675, filed on Dec. 5, 2017.

(51) Int. Cl.
  *B60J 7/14*    (2006.01)
  *B60J 7/19*    (2006.01)
  *B60P 3/42*    (2006.01)

(52) U.S. Cl.
  CPC .............. *B60J 7/141* (2013.01); *B60J 7/198* (2013.01); *B60P 3/42* (2013.01)

(58) Field of Classification Search
  CPC ... B60J 7/141; B60J 7/146; B60J 7/148; B60J 7/10; B60J 7/12; B60P 3/42
  USPC ......... 296/26.06, 100.06, 100, 7, 100.09, 10
  See application file for complete search history.

(56) References Cited

U.S. PATENT DOCUMENTS

| | | | | | |
|---|---|---|---|---|---|
| 3,050,331 | A | * | 8/1962 | Mansen | B60P 3/34 296/173 |
| 3,690,719 | A | * | 9/1972 | Yount | B60P 3/34 296/100.07 |
| 3,995,890 | A | * | 12/1976 | Fletcher | B60P 3/32 296/10 |
| 7,207,614 | B2 | * | 4/2007 | Briggs | B60J 7/1614 296/26.06 |
| 7,243,965 | B2 | * | 7/2007 | King | B60J 7/1614 296/164 |
| 2006/0119124 | A1 | * | 6/2006 | Briggs | B60J 7/1614 296/26.06 |
| 2014/0183893 | A1 | * | 7/2014 | Scarbrough | B60P 3/34 296/10 |

* cited by examiner

*Primary Examiner* — Dennis H Pedder
(74) *Attorney, Agent, or Firm* — Caesar Rivise, PC (57) ABSTRACT

A truck bed cover for covering a bed of a truck comprises a top panel; two side panels, each coupled to the top with side hinges at opposite sides of the top, respectively, the two side panels transitionable from parallel with the top to perpendicular with the top; a front panel and a rear panel, each coupled to the top with a front hinge at opposite sides of the top, respectively, and between the two side panels; a bottom lock member on the bottom of each of the two side panels for attaching the two side panel to opposite walls of the truck that define the bed; a top lock member at the top of each of the two sides, each top lock member engages with the side hinges, respectively, to prevent each of the sides from extending past perpendicular with the top when swiveled away from parallel with the top.

20 Claims, 7 Drawing Sheets

FIG. 10

TRUCK BED COVER AND METHOD THEREOF

The present application claims priority to U.S. provisional application 62/594,675 which is hereby incorporated by reference in its entirety.

FIELD OF THE INVENTION

The present application relates to pick-up trucks and more particularly to a pick-up truck cargo bed. Specifically, and apparatus and method thereof are disclosed for covering a pick-up truck cargo bed.

BACKGROUND OF THE INVENTION

A pickup truck is a well know motorized vehicle that comprises an enclosed cab (in which a driver and possible passengers sit), and an open cargo area (which may also be referred to as the pickup truck bed). The open cargo area is typically surrounded by the rear of the enclosed cab, a hinged tailgate opposite thereto, and low sides extending from the front to the rear of the cargo area. During normal operation, the cargo area is fully exposed, so that large objects area readily seen, and may be inserted and removed therefrom.

There are basically four different styles of pickup beds. A short bed (also referred to as a short box) is the most popular form of truck bed. The short beds are generally between six feet and six and a half feet long. The beds enable heavy loads to be hauled without making driving the vehicle overly difficult. Long beds (also referred to as a long box) are generally seven to eight feet long. The beds are more commonly found on commercial vehicles. A standard bed features fender wells inside the truck bed. The outside of a truck with a standard bed tends to be smooth, and the walls usually line up with the edge of the wheel wells. A stepside bed features fender wells that bulge towards the outside of the truck bed.

Pickup truck drivers may wish to cover their pickup truck beds. Sometimes the issue is one of security. It is desired to create a secure environment in the truck bed. In this way valuables, such as parts and tools, can be kept in the bed with reduced risk of theft. Sometimes, the issue is the cargo capacity of the bed. It may not be safe to stack objects in the bed above the bed sides. Sometimes the issue is protection from the weather. It may be desired to convert the bed into an environment where objects are protected from exposure to rain and snow.

A number of technologies are currently available to cover a truck bed. Bestop sells the Supertop product that provides a raised truck bed cover. The product is comprised of fabric and vinyl clear windows. A tonneau cover features a horizontal member that covers the top of the truck bed. Tonneau covers extend across the truck bed from the height of sidewalls, thus these covers do not provide the vertical storage available from a product such as the Supertop. Tonneau covers are available in different configurations, and while they do not provide the storage area of a Supertop, are easy to use and enable truck bed access from the top of the bed (as opposed to a Supertop that enables access from the rear). Fiberglass truck bed canopies are also available, and are relatively secure while providing substantial storage space, but may be heavy and do not collapse for storage.

SUMMARY OF THE INVENTION

A truck bed cover for covering a bed of a truck comprises a top panel; two side panels, each coupled to the top with side hinges at opposite sides of the top, respectively, the two side panels transitionable from parallel with the top to perpendicular with the top; a front panel and a rear panel, each coupled to the top with a front hinge at opposite sides of the top, respectively, and between the two side panels; a bottom lock member on the bottom of each of the two side panels for attaching the two side panel to opposite walls of the truck that define the bed; a top lock member at the top of each of the two sides, each top lock member engages with the side hinges, respectively, to prevent each of the sides from extending past perpendicular with the top when swiveled away from parallel with the top.

BRIEF DESCRIPTION OF THE DRAWINGS

FIGS. 4a and 4b are close-up views of a hinge member attached to a top and side in accordance with an exemplary embodiment of the present invention. In FIG. 4a the side is up (horizontal or inward) and in FIG. 4b the side is down (vertical or outward).

DETAILED DESCRIPTION

While various options exist for covering the pickup truck bed, a need exists for a cover that is inexpensive, secure, and that can be at least partially disassembled for storage that is as simple as possible. Accordingly, a truck bed cover and method thereof is described below with the use of examples in order to illustrate exemplary embodiments of the present invention.

Figure 1:
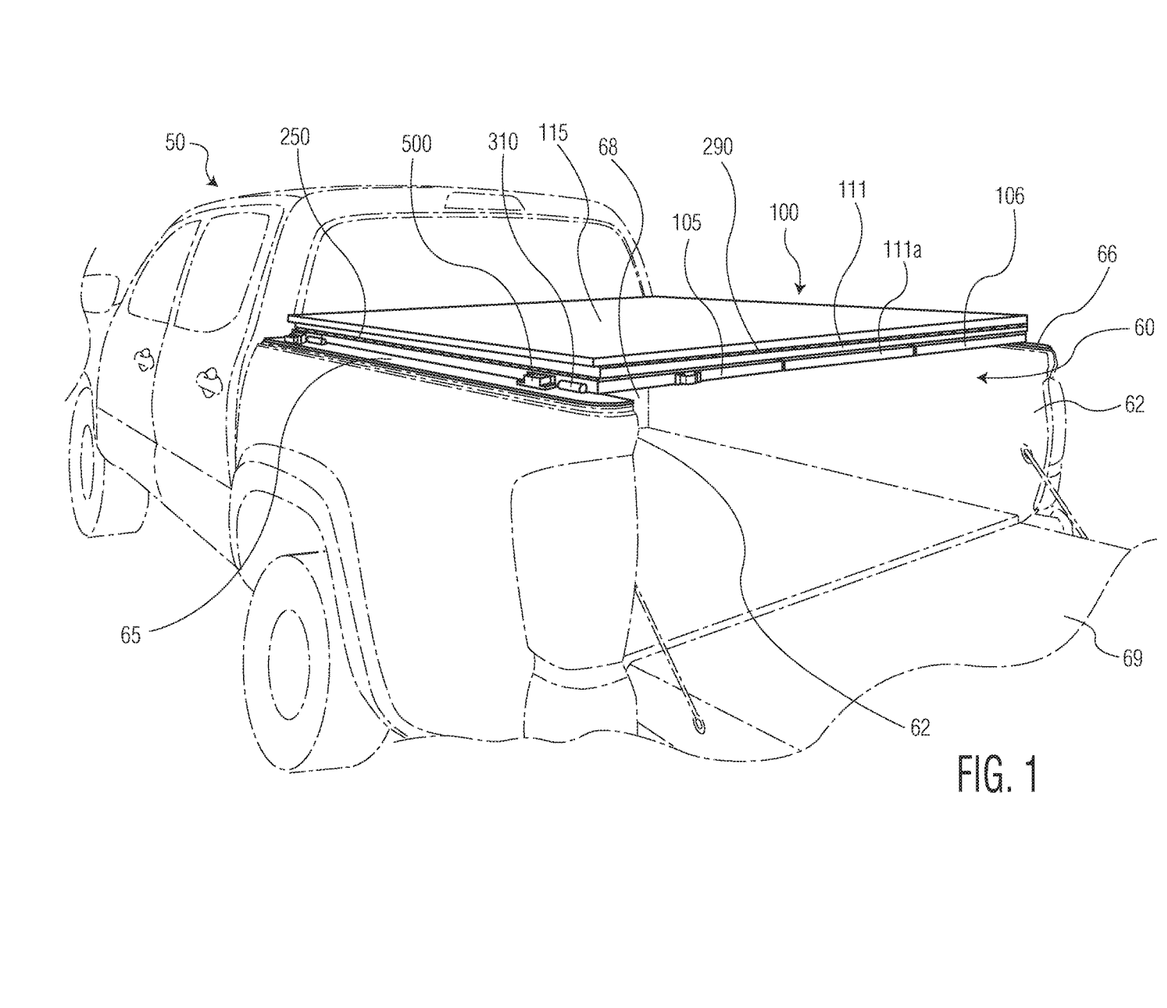
FIG. 1 is a rear perspective view of a truck bed cover in accordance with an exemplary embodiment of the present invention. The two sides, front and rear are all folded inward.

FIG. 1 illustrates vehicle 50 which may be, for example, a pick up truck. Vehicle 50 includes in a rear portion thereof bed 60. Bed 60 is normally exposed so that any objects placed therein are readily visible. Bed 60 is defined by left and right walls 60, the rear of the truck cab 68 and tail gate 69. In FIG. 1, tail gate 69 is shown in a horizontal position, which is useful for loading objects into bed 60. Under normal driving conditions, however, tailgate 69 is in a vertical position by virtue of being folded upward.

FIG. 1 illustrates cover 100 that desirably extends above bed 60 in order to provide protection and privacy to any contents placed in bed 60. Cover 100 is shown in FIG. 1 in a downward, folded orientation that is desirable for cover 100 to be stored. In the orientation shown in FIG. 1, the structural members of cover 100 are shown in a horizontal orientation. This enables vehicle 50 to be driven with cover 100 placed over bed 60. Cover 100 generally extends from vehicle left top 65 to vehicle right top 66. Cover 100 also generally extends from truck cab rear 68 towards the rear of bed 60 so that cover 100 meets tailgate 69 when tailgate 69 is in a vertical orientation.

Cover 100 may be made of any material that provides structural integrity, although in one exemplary embodiment, wood is used generally used. Other materials may be used as well, including resin. If a porous material such as wood is used, it is desirable for the wood to be sealed, so that environmental factors do not cause premature aging of cover 100. Exemplary materials to seal cover 100 include certain chemical sealants (such as shellacs, varnishes, vinyl resins, etc.), other types of sealants (including tar sealant with or without fiberglass material), industrial weather coatings, exterior paints, etc. Plastic materials typically do not require sealing, but may not be as sturdy as wood and/or may be more expensive than wood. However, the possible use of plastic materials should not be excluded.

In FIG. 1, cover 100 is in a folded orientation. Top panel 115 rests on top, and side panels 105 and 106 are folded inward so that they are below top panel 115 and parallel thereto. Rear panel 111 is also folded inward so that it is below top panel 115 and parallel thereto. Rear plate 111a is attached to rear panel 111a and provides an aesthetically pleasing view so that side panels 105 and 106 and rear panel 111 appear to be lined up.

It is noted that side panels 105 and 106 rotate about respective hinges 250 (hinge 250 that enables side panel 106 to rotate is not visible in FIG. 1). Rear hinge 290 enables rear panel 111 to rotate as well. In FIG. 1, it is noted that hinge 260 is in a higher position than hinge 250. In this manner, when lowering cover 100 from a raised configuration, rear panel 111 can be folded first, and then side panels 105 and 106 can be folded so that at least portions of rear panel 111 are between side panels 105, 106 and top panel 115.

FIG. 1 also illustrates lock member 500 and top member 310. When cover 100 is in the folded orientation shown in FIG. 1, lock member 500 engages top member 310 so that cover 100 is attached to vehicle 50. This enables vehicle 50 to be driven with cover 100 in the folded orientation shown in FIG. 1. The operation of lock member 500 and top member 310 is further described below.

Figure 2:
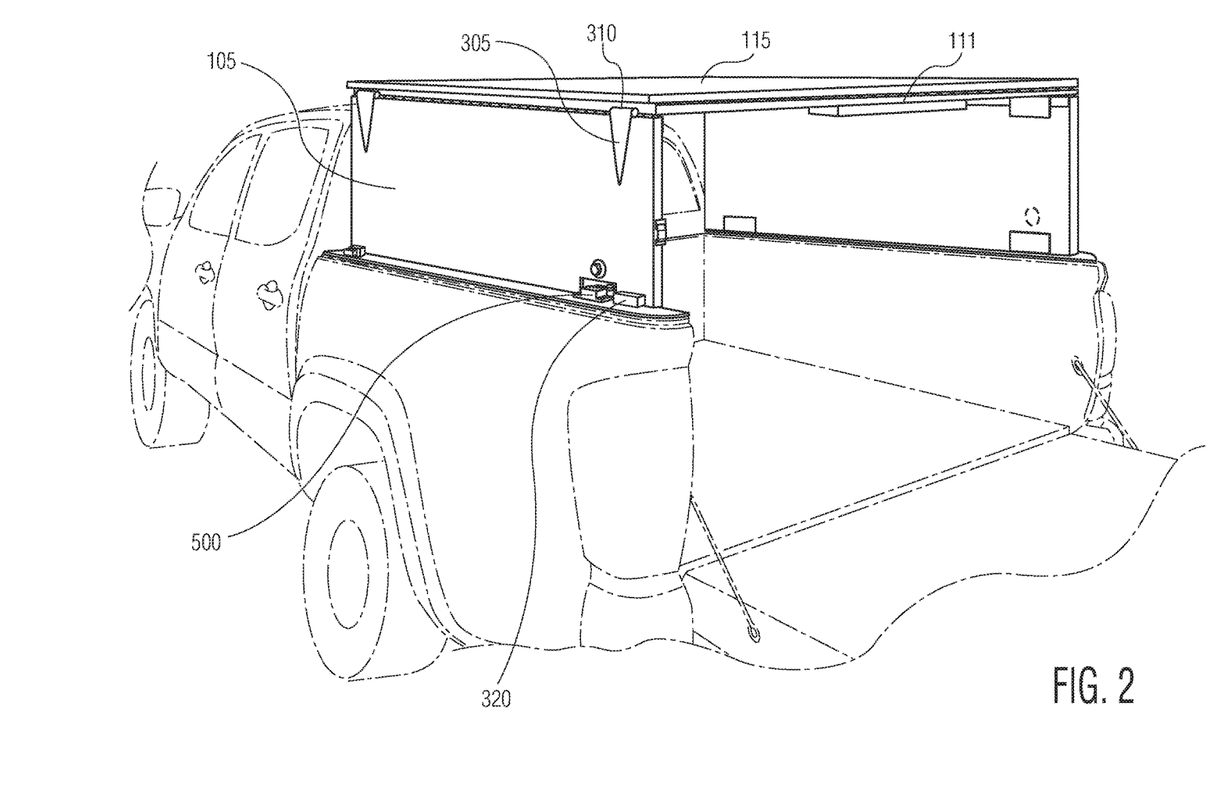
FIG. 2 is a further rear perspective view of the cover illustrated in FIG. 1 with the sides of the cover in an outward (or downward) position.

FIG. 2 illustrates cover 100 in a partially raised configuration. In this configuration, top panel 115 is in a higher position than in FIG. 1, and side panels 105 and 106 have been rotated downward from the position they are shown in FIG. 1, so that side panels 105 and 106 are each in a vertical orientation. In FIG. 2, front panel 110 and rear panel 111 remain in a horizontal position. Therefore, in order to erect cover 100, as a first step, side panels 105 and 106 are rotated outward, so they are in a vertical orientation, while front panel 110 and rear panel 111 remain folded, i.e. in horizontal orientations.

Front panel 110 and rear panel 111 can remain in horizontal positions by several mechanisms. In one exemplary embodiment, magnets are attached to the bottom surface of top panel 115 and surfaces of front panel 110 and/or rear panel 111. As the magnets adhere, front panel 110 and/or rear panel 111 stay in horizontal position. Alternatively, levers (such as finger release levers) can be used to slide out pistons that engage openings associated with left side 105 and right side 106. Such levers will be described in greater detail below.

Figure 3:
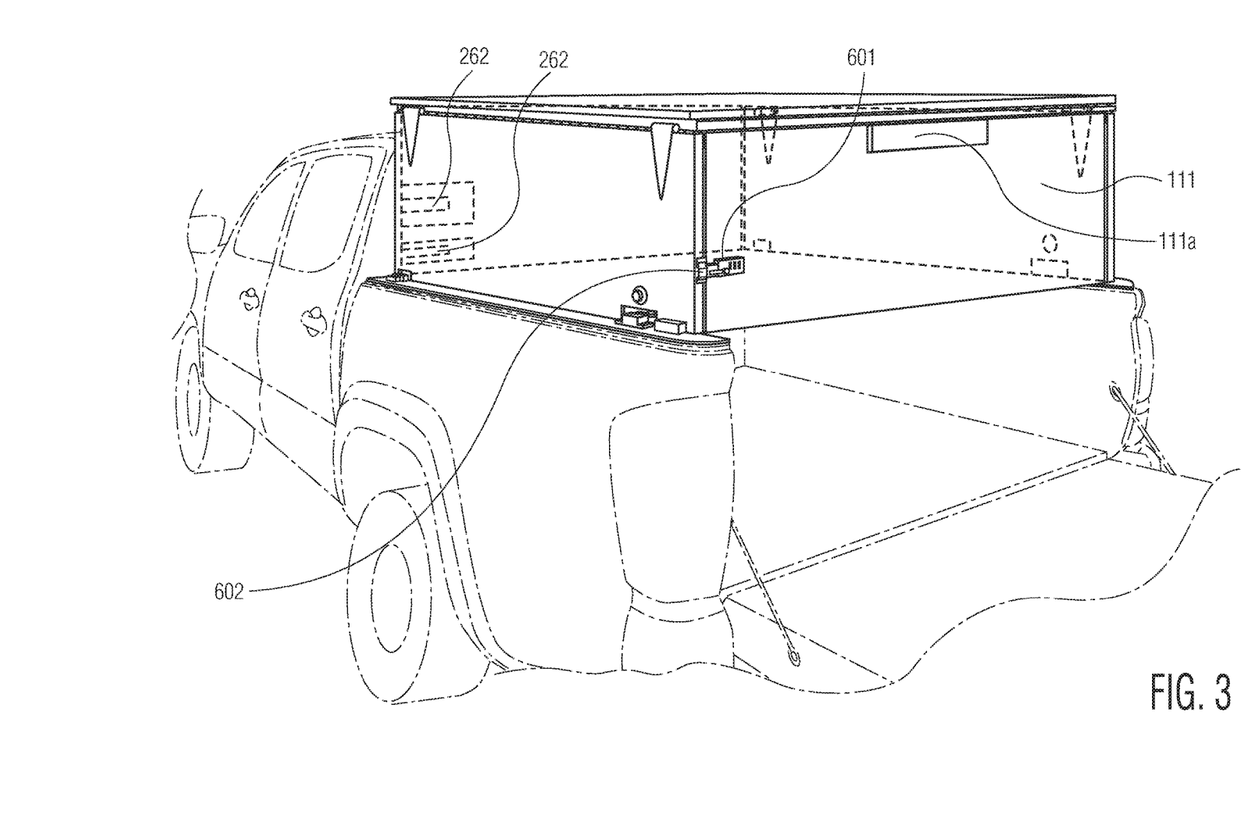
FIG. 3 is a further rear perspective view of the cover illustrated in FIG. 1 and FIG. 2 with the two sides, front and rear in an outward (or downward) position.

FIG. 3 illustrates a further step with regard to erecting cover 100. In this step, front panel 110 and rear panel 111 have been rotated from horizontal positions to vertical positions. This creates a closed appearance to cover 100. Additional attachment members may be used in order to keep front panel 110 and rear panel 111 in place. For example, front panel 110 may be kept in place through the use of levers (finger release levers) that will be described in greater detail below. Rear panel 111 may be held in place by engaging exemplary latch 601 with bracket 602. As illustrated, bracket 602 may be attached to the rear side edge of left side 105, while latch 601 may reside on the back surface of rear panel 111 (when in a vertical orientation). Latch 601 may be, for example, a sliding member that engages an opening formed between bracket 602 and the side edge of left 105.

Figure 4A:
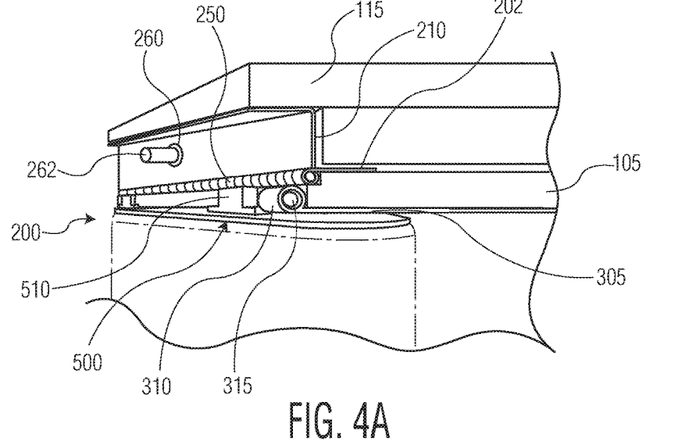

FIG. 4A is a perspective close up view that shows a portion of cover 100 in a folded orientation. In particular, cover 100 is resting on vehicle left top 65 (shown in FIG. 4A) and vehicle right top 66 (not shown in FIG. 4A). As previously described, left top 65 and right top 66 are the tops of vehicle sides 62.

FIG. 4A illustrates left side 105 in a horizontal orientation. Portions of outer bracket 300 may be seen in FIG. 4A, but outer bracket 300 is shown with greater clarify in FIG. 4B. Outer bracket 300 includes top member 310 that has opening 315. Lock member 500 is mounted onto lock base 510 that is attached to vehicle left top 65. Lock member 500 includes piston 520 (not visible in FIG. 4A) that engages opening 315 within top member 310 in order to attach cover 100 to vehicle 50. Details regarding lock member 500 are provided below.

FIG. 4A also illustrates piston 262 extending through opening 260. Piston 262 is extending from front panel 110 which is not visible in FIG. 4A and which is in a horizontal orientation. By extending from front panel 110, front panel 110 is secured in a horizontal orientation. Piston 262 is described in further detail below.

Figure 4B:
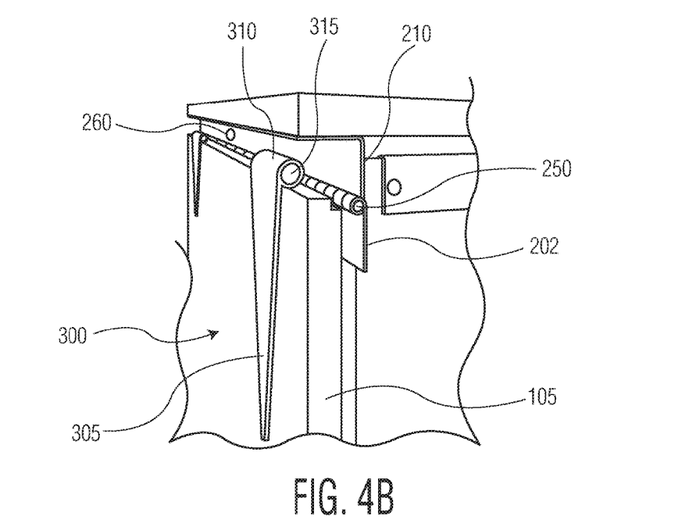

Left side 105 is attached to top panel 115 via hinge member 200. While portions of hinge member 200 are shown in FIG. 4A, other portions of hinge member 200 are also shown in FIG. 4B. Hinge member 200 includes lower member 202 that is attached to left side 105, upper member 210 that attaches to top 115, and hinge 250 that allows lower member 202 to rotate relative to upper member 210. Hinge member 200 is desirably comprised of metal.

FIG. 4B is a perspective close up view that shows a portion of cover 100 in an unfolded orientation. Left side 105 has transitioned from a horizontal orientation to a vertical orientation. Elongated member 305 extends along the exterior side of left side 105 and is attached thereto. Lower member 202 has rotated from the horizontal position shown in FIG. 4A to the vertical position shown in FIG. 4B.

Top member 310 is no longer secured to left top 65 via lock member 500, but top member 310 is serving another role. In particular, as top member 310 rotates with left side 105 as left side 105 is transitioning from a horizontal to a vertical orientation, top member 310 eventually makes contact with upper member 210. By making contact with upper member 210, left side 105 is preventing from moving more than 90 degrees relative to top panel 115. This "hard stop"

provides additional support and structure for cover 100 so that left side 105 is maintained perpendicular relative to top panel 115.

FIG. 4B also shows opening 260 without piston 262 extending outward therefrom. In FIG. 4A, piston 262 extends from opening 260 because piston 262 is extending from front panel 110 that is in a horizontal orientation. In this manner, by having piston 262 extend from front panel 110 and through opening 260, piston 262 helps to maintain front panel 110 in a horizontal orientation. By retracting piston 262, front panel 110 is able to transition from a horizontal orientation to a vertical orientation as shown in FIG. 3. In particular, FIG. 3 shows two exemplary pistons 262 (drawn in phantom). The top piston 262 was previously extended into opening 260 (when front panel 110 was in a horizontal orientation). The top piston 262 is retracted when front panel 110 is in a vertical orientation, and the bottom piston 262 may be extended into an opening (not shown) in order to maintain front panel 110 in a vertical orientation. The use and locations of pistons 262 are exemplary.

Figure 5:
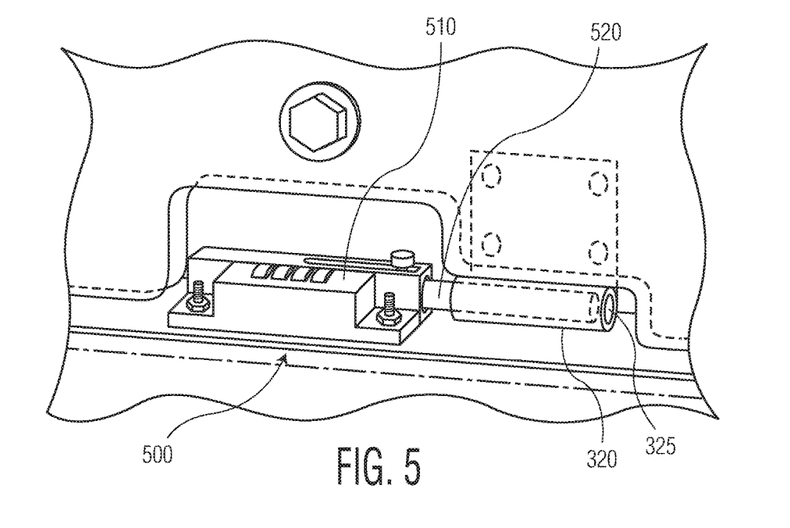
FIG. 5 is a close-up view of how a side engages a top edge of the truck bed in accordance with an exemplary embodiment of the present invention.

FIG. 5 is a close up perspective view of lock member 500. Lock member 500 is also shown in FIG. 1 and FIG. 2. Lock member 500 includes lock base 510 and piston 520. In the example shown, lock member 500 is sometimes referred to as a combination bolt lock or a combinated gate bolt (manufactured by Vault Locks or Frank J. Martin). Lock base 510 includes a combination lock mechanism for security. When the proper combination has been selected, piston 520 is able to slide, and to extend out of lock 510. When other than the proper combination has been selected, piston 520 is in a locked, extended state.

In FIG. 5, cover 100 is in the orientation shown in FIG. 2. Bottom member 320 is located at the bottom of left side 105. Bottom member 320 includes opening 325. Piston 520 is extended from lock base 510 so that piston 520 extends into opening 325. In this manner, cover 100 is attached to vehicle 50 as shown in FIG. 2. When front panel 110, rear panel 111, left side 105 and right side 106 are in horizontal orientations, piston 520 extends into opening 315 of top member 310 (see FIG. 1).

Figure 6:
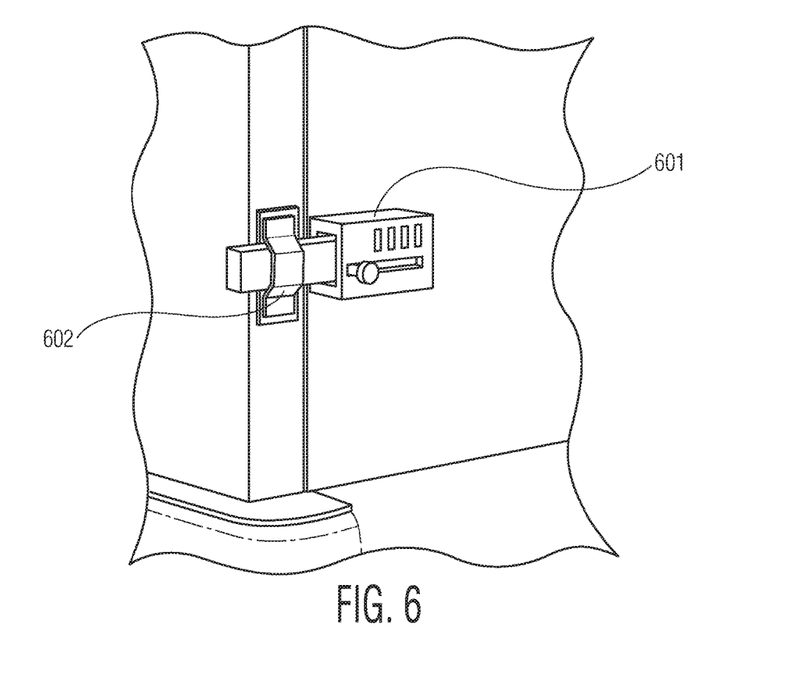
FIG. 6 is a rear view that illustrates how the rear of the cover engages a side of the cover in accordance with an exemplary embodiment of the present invention.

FIG. 6 is close up perspective view that shows how rear panel 111 is secured to left side 105. Latch 601 is attached to rear panel 111 and bracket 602 is attached the side of left side 105. Bracket 602 forms an opening between it and left side 105. Latch 601 includes a piston that can be slid into the opening formed by bracket 602. In this manner, rear panel is secured in a vertical orientation.

Figure 7:
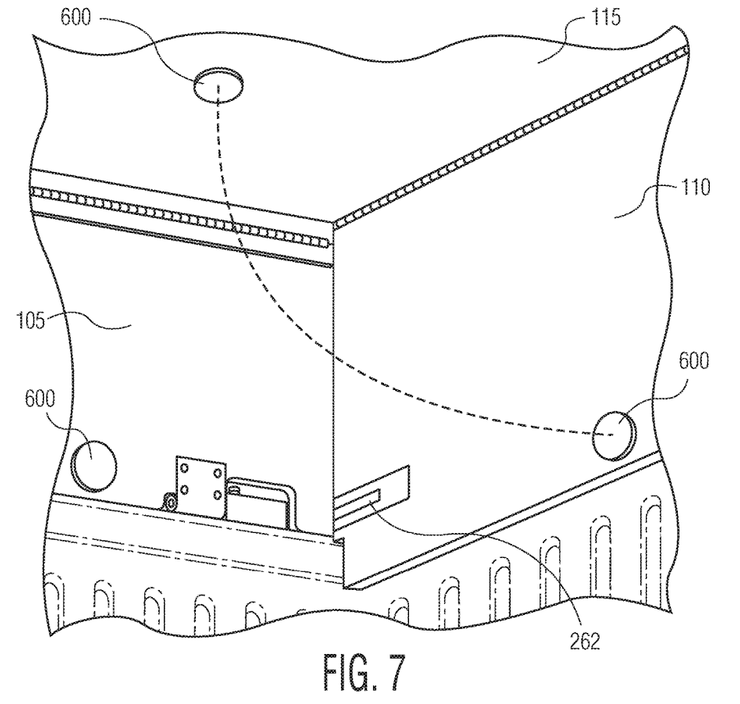
FIG. 7 is a perspective view of the interior of the cover from a location where the left side and the front panel meet.

FIG. 7 is a perspective view of a portion of cover 100. The view is an interior view of cover 100 at the location where left side 105 meets front panel 110 when both are in a vertical orientation. Piston 262 is shown and may engage an opening (not shown) in left side 105 in order to maintain front panel 110 in a vertical orientation. Piston 262 (one or more) may be included with a finger release lever (for example) so that piston 262 is essentially embedded into front panel 110. In this manner, when front panel 110 is folded upward so that it is in a horizontal orientation, front panel 110 is able to lay flush with top panel 115.

FIG. 7 also illustrates optional magnets 600. One magnet is attached to the interior of top panel 115 while another magnet 600 is attached front panel 110. The magnets are positioned so that when front panel 110 is in a horizontal position, the two magnets meet. In this manner, magnetic force is used to maintain front panel 110 in contact (in a horizontal orientation) with the interior of top panel 115. Magnet 600 is also attached to the interior of left side 105. That magnet and a corresponding magnet attached top panel 115 allows those two magnets to be attracted to each other, so that left side 105 can be maintained in a horizontal orientation.

Figure 8:
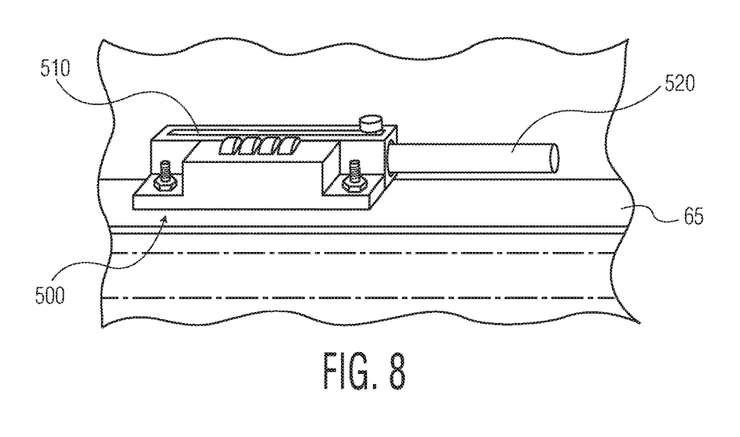
FIG. 8 is a perspective view that includes a close up view of a lock member.

FIG. 8 is a further view of lock member 500. Lock member 500 includes lock base 510 and piston 520. Lock member 500 is attached to vehicle left top 65. In this manner, when piston 65 enters opening 315 and/or opening 325, cover 100 is attached to vehicle 50.

Figure 9:
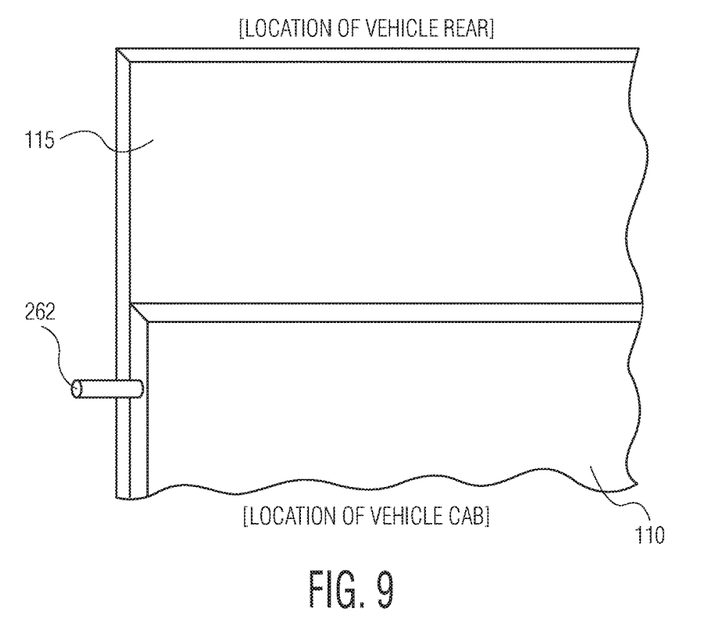
FIG. 9 is a view of the interior of cover 100 from the perspective of inside a vehicle bed and looking up. The bottom of the figure is the portion of the cover closest to the vehicle cab while the top of the figure is the portion of the cover closest to the vehicle rear.

FIG. 9 is a view of top panel 115 and front panel 110. The view is from the perspective of the interior of cover 100 looking up. The side of top panel 115 closest to the cab of vehicle 50 is at the bottom of the figure. The side of top panel 115 closest to the rear of vehicle 50 is at the top of the figure. The figure shows front panel 110 in a horizontal position, parallel to the bottom surface of top panel 115. Piston 262 is in an extended configuration so that it extends through opening 260 (not shown in FIG. 9). By piston 262 extending through opening 260, top panel 115 is maintained in the position shown in FIG. 9.

Figure 10:
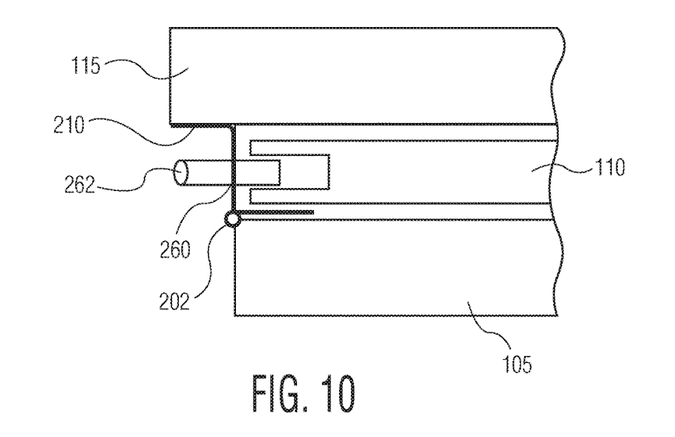
FIG. 10 is a cross sectional view of the cover in a configuration in which the left side and the front panel are folded in and in a horizontal configuration.

FIG. 10 is a cross-sectional view along a cut line extending through cover 100 from top to bottom. The view shown in FIG. 10 has front panel 110 and left side 105 both in a horizontal orientation. Top panel 115 appears on the top of the image in a horizontal orientation. Front panel 110 is below top panel 115 and is folded inward so it, too, is in a horizontal orientation. Projection 262 is projecting outward so it extends through opening 260 in upper member 210 (so that top panel is maintained in a horizontal orientation). Left side 105 is also folded inward so that it, too, is in a horizontal orientation. Left side 105 is maintained in a horizontal until it is rotated into a vertical orientation.

The above explanation has described features with regard to left side 105. Right side 106 may be, for example, a mirror image of left side 105 and all description with regard to left side 105 may also apply to right side 106. Thus, when left side 105 is folded in and in a horizontal orientation, right side 106 may also be folded in, and in a horizontal orientation. While piston 262 may be used to maintain front panel 110 in a horizontal orientation, a further piston 262 may extend into a corresponding opening in right side 106 in order to help maintain front panel 110 in a horizontal orientation. While hinge member 200, piston 262, bottom member 320 outer bracket 300 and lock member 500 (and other parts) have been described with regard to left side 105, corresponding forms of all of these parts may be used on combination with right side 106. While many parts have been described in singular (i.e. outer bracket 300), it is understood that a plurality of any of these parts may be included for duplicity, structural integrity and safety.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

The invention claimed is:

1. A truck bed cover for covering a bed of a truck, said truck bed cover comprising:

a top panel;

two side panels, each coupled to the top with side hinges at opposite sides of the top, respectively, said two side panels transitionable from parallel with the top to perpendicular with the top;

a front panel and a rear panel, each coupled to the top with a front hinge and a rear hinge at opposite sides of the top, respectively, and between the two side panels;

a bottom lock member on the bottom of each of the two side panels for attaching the two side panels to opposite walls of the truck that define the bed, respectively;

a top lock member at the top of each of the two sides, each top lock member engages with the side hinges, respectively, to prevent each of the sides from extending past perpendicular with the top when the two sides are swiveled away from parallel with the top.

2. A truck bed cover according to claim 1, further comprising vehicle lock members on each of the opposite walls of the truck, wherein the vehicle lock members engage the bottom lock members when the two side panels are in a vertical orientation, and engage the top lock member when the two side panel are in a horizontal orientation.

3. A truck bed cover according to claim 1, wherein in a first configuration the two side panels, the front panel, and the rear panel are in a horizontal orientation and in a second configuration the two side panels, the front panel and the rear panel are in a vertical orientation.

4. A truck bed cover according to claim 1, wherein an axis of rotation of the rear hinge is perpendicular to and either above or below a further axis of rotation of the side hinges.

5. A truck bed cover according to claim 1, where at least one of the top panel, the two side panels, the front panel, and the rear panel are comprised of wood.

6. A truck bed cover according to claim 1, wherein at least one of the front panel and the rear panel include a slide member that engages a respective bracket on at least one of the two side panels.

7. A truck bed cover according to claim 1, wherein each top lock member applies force to sides of the top panel above the axis of rotation of one of the side hinges when the side panels are oriented vertically.

8. A truck bed cover according to claim 1, wherein each top lock member includes an opening.

9. A truck bed cover according to claim 8, further comprising a vehicle lock member on a wall of the truck, wherein the vehicle lock member engages the opening when the side panels are in a horizontal orientation.

10. A truck bed cover according to claim 1, wherein the side hinges each include a plate above a respective axis of rotation, and each top lock member contacts a respective plate when the two side panels are vertically oriented.

11. A method of covering a bed of a truck, said method comprising the steps of:

providing:

a top panel;

two side panels, each coupled to the top with side hinges at opposite sides of the top, respectively, said two side panels transitionable from parallel with the top to perpendicular with the top;

a front panel and a rear panel, each coupled to the top with a front hinge and a rear hinge at opposite sides of the top, respectively, and between the two side panels;

a bottom lock member on the bottom of each of the two side panels for attaching the two side panels to opposite walls of the truck that define the bed, respectively;

a top lock member at the top of each of the two sides, and causing each top lock member to engage with the side hinges, respectively, to prevent each of the sides from extending past perpendicular with the top when the two sides are swiveled away from parallel with the top.

12. A method of covering a bed of a truck according to claim 11, further comprising the step of providing vehicle lock members on each of the opposite walls of the truck, wherein the vehicle lock members engage the bottom lock members when the two side panels are in a vertical orientation, and engage the top lock member when the two side panel are in a horizontal orientation.

13. A method of covering a bed of a truck according to claim 11, wherein in a first configuration the two side panels, the front panel, and the rear panel are in a horizontal orientation and in a second configuration the two side panels, the front panel and the rear panel are in a vertical orientation.

14. A method of covering a bed of a truck according to claim 11, wherein an axis of rotation of the rear hinge is perpendicular to and either above or below a further axis of rotation of the side hinges.

15. A method of covering a bed of a truck according to claim 11, where at least one of the top panel, the two side panels, the front panel, and the rear panel are comprised of wood.

16. A method of covering a bed of a truck according to claim 11, wherein at least one of the front panel and the rear panel include a slide member that engages a respective bracket on at least one of the two side panels.

17. A method of covering a bed of a truck according to claim 11, wherein each top lock member applies force to sides of the top panel above the axis of rotation of one of the side hinges when the side panels are oriented vertically.

18. A method of covering a bed of a truck according to claim 11, wherein each top lock member includes an opening.

19. A method of covering a bed of a truck according to claim 18, further comprising a vehicle lock member on a wall of the truck, wherein the vehicle lock member engages the opening when the side panels are in a horizontal orientation.

20. A method of covering a bed of a truck according to claim 11, wherein the side hinges each include a plate above a respective axis of rotation, and each top lock member contacts a respective plate when the two side panels are vertically oriented.

* * * * *